Dec. 8, 1942.    R. A. NORBOM    2,304,117
CONTAINER TRANSFER EQUIPMENT FOR VEHICLES
Filed July 11, 1941    5 Sheets-Sheet 1

Inventor
Ragnar A. Norbom
By
Attorney.

Dec. 8, 1942.  R. A. NORBOM  2,304,117
CONTAINER TRANSFER EQUIPMENT FOR VEHICLES
Filed July 11, 1941  5 Sheets-Sheet 5

Inventor
Ragnar A. Norbom
By
Attorney.

Patented Dec. 8, 1942

2,304,117

UNITED STATES PATENT OFFICE 2,304,117

CONTAINER TRANSFER EQUIPMENT FOR VEHICLES

Ragnar A. Norbom, New York, N. Y., assignor to National Fitch Corporation, a corporation of Delaware Application July 11, 1941, Serial No. 402,025

28 Claims. (Cl. 214—83)

This invention relates to equipment for transferring freight containers to and from vehicles. The equipment is adapted to be mounted in or on the load support, platform, frame or chassis of a vehicle and to transfer freight containers to the vehicle from an adjacent platform or other support at the side of which the vehicle may be parked as well as from the vehicle to an adjacent platform or support. The equipment may be mounted on various types of vehicles, including highway trucks, truck trailers, and railroad cars. A vehicle having the equipment of this invention may be used as a carrier in the hauling of freight containers between a warehouse loading platform and a railroad car or other vehicle, such as a conventional highway truck. A vehicle having the present freight transfer equipment may also be used in passing freight containers between a vehicle not so equipped and a freight car. The freight containers to be transferred by the present equipment may be relatively large in size and may weigh, when loaded, a number of tons. The present equipment has particular usefulness in the transfer of containers for less than a freight car shipment, but of a size to hold as much as a quarter or a half of a freight car load. The freight container may also be of a size and form corresponding to a demountable load carrying body for the truck, trailer or other vehicle having the equipment of this invention.

Trucks and other vehicles have, heretofore, been provided with equipment for transferring freight containers to and from the vehicle. Experience with prior transfer equipment for trucks shows that such equipment has a number of objectionable features and disadvantages. Usually the prior types of equipment were relatively costly, complicated in construction, and difficult to operate. A number of prior types of transfer equipment are objectionable for the reason that they do not provide for a continuous and uninterrupted transfer operation in moving a freight container onto or off of the vehicle. Such types of equipment require the vehicle driver or attendant to interrupt each transfer operation one or more times before the transfer operation is completed, and to adjust the equipment and/or its connection to the freight container during each interruption. Prior art equipment of these types is, therefore, troublesome to control properly and may not be operated without difficulty by an unskilled attendant.

According to the present invention, the noted objections and disadvantages of prior transfer equipment are avoided and a relatively simple and inexpensive construction is provided. In the use of equipment embodying a preferred form of the present invention, the transfer operation in loading or unloading a vehicle requires only two controlling movements by the attendant, once the equipment is connected to a freight container. One controlling movement would start operation of the equipment. The other controlling movement would stop the action of the equipment when the transfer operation is completed.

In a preferred embodiment of this invention, the transfer equipment is normally disposed on a vehicle and within its outer limits, so that no part of the equipment extends beyond the vehicle during its use as a carrier in hauling operations. Yet the equipment in simple manner is adapted to reach beyond a side of the vehicle in shifting a freight container from an adjacent platform to the vehicle, as well as from the vehicle to an adjacent platform. The equipment is also adapted to reach beyond the opposite side of the vehicle in completing a vehicle loading operation so that the freight container being transferred may be properly centered on the vehicle although the container is substantially the same in size as the load support or platform of the vehicle.

It is, therefore, an object of this invention to provide a novel freight container transfer equipment, which is relatively simple and inexpensive to manufacture, to mount on a vehicle, and to operate.

A further object is to provide freight container transfer equipment for vehicles, which equipment may be readily and properly operated and at the same time requires no special skill or training on the part of the attendant.

Still another object is to provide freight container transfer equipment which, when placed in operation by an attendant, is effective to complete a loading or unloading operation for the vehicle having such equipment.

A further object is to provide transfer equipment which is adapted to load and unload a freight container from either side of a vehicle and in a single operation, which need not be interrupted by the attendant.

Another object is to provide novel transfer equipment the overall dimension of which in hauling operations is not in excess of the width of the vehicle, but which in loading and unloading operations is effective to provide complete transfer of the container to or from the vehicle and from or to an adjacent platform.

Other objects and advantages of this invention will be readily apparent from the following description, the appended claims, and the accompanying drawings which illustrate a preferred embodiment of the invention.

In the drawings.

Figure 5 illustrates the transfer equipment in an intermediate stage of a transfer operation.

Figure 20 is on sheet 3 of the drawings.

Figure 1:
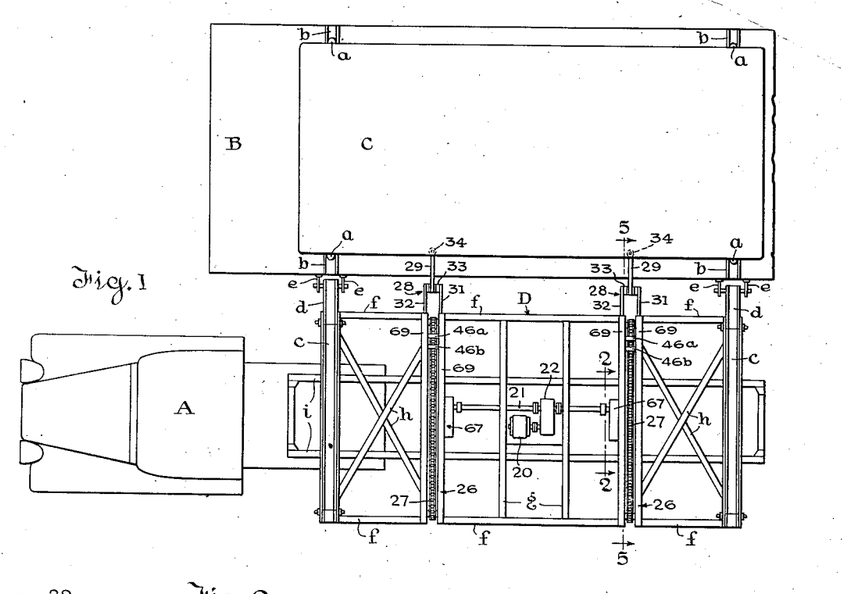
Figure 1 is a plan view of a tractor-trailer type of highway truck provided with transfer equipment embodying this invention. The plan view of Figure 1 also includes a portion of an adjacent railway car and a freight container, the container being on the car and connected to the transfer equipment of the truck.

Referring now to the accompanying drawings in explaining a preferred embodiment of this invention, Figure 1 shows a vehicle or highway truck A parked adjacent a platform B which supports a merchandise or freight container C. The vehicle A may be of the truck-trailer type as illustrated. The load support of the trailer may be the frame D of the trailer chassis or a load supporting platform of any conventional construction. The platform B may be the platform of a freight or railway car, the loading platform of a warehouse, or the load support or platform of a second truck. The container C may be a demountable trailer body, or a freight car section such as a quarter or half car section, or a warehouse container for holding a substantial quantity of merchandise, such as a truck load. The container C may also be of the open or closed top type. For convenience, the container C will be called a "freight container," the latter term being used generically for containers including the types described above.

The freight container C may be provided with skid rails $a$ which are adapted to slide in and be guided by the channels $b$ on the platform B and the channels $c$ of the trailer as the container C is transferred from the platform B to the trailer or from the trailer to the platform B. The channels $b$ and $c$ may extend transversely of the platform B and the truck trailer frame D, as illustrated, where the transfer operation is to be transverse of the truck A. Where the container C is to be shifted lengthwise of the platform B onto the rear end of the trailer and then lengthwise of the trailer frame D, the channels $b$ and $c$ would be correspondingly arranged on the railway car B and the trailer frame D respectively to facilitate such transfer.

The trailer frame D is provided with members $d$ which serve as bridges between the channels $b$ and $c$ in the transfer of the freight container C. Each bridge member $d$ is of such length that it may extend varying distances beyond the trailer frame D to reach from the frame D to the platform B. The bridge members $d$ may be adjustably secured to the channels $c$ or to the trailer frame D. At their outer ends, the bridge members $d$ are adapted to be secured detachably to folding wings $e$ which are mounted on the side of the platform B. If desired, similar bridge members $d$ may be provided at both ends of each channel $c$ and provide for loading and unloading of the truck A from either of two opposite sides thereof.

When the members $d$ are in their bridging position as illustrated (Figure 1), the channels $b$ and $c$ as well as the members $d$ are in registration or alignment and provide two substantially continuous guides for the container skid rails $a$ during the transfer of the freight container C.

The trailer frame D may be mounted on the main sills $i$ (Figure 1) of the trailer chassis and may comprise longitudinal beams $f$, transverse beams $g$, and reinforcing members $h$. The beams $f$ form two opposite sides of the frame D, and the channels $c$ are shown as arranged at the front and rear sides of the frame D.

The power for transferring the freight container C onto or off of the trailer frame D is derived from a conventional type of motor 20. The motor 20 drives a shaft 21 through suitable couplings and a conventional reduction gearing 22 (Figure 1). The reduction gearing 22 may include a conventional worm and worm wheel (not shown) for a purpose to be described hereinafter.

*Drive transmitting mechanisms*

The drive of the shaft 21 may be transmitted to the freight container C by means of one or more drive transmitting mechanisms 26, each preferably extending substantially parallel to the channels $c$ on the trailer frame D. In a preferred embodiment of this invention, the trailer frame D is provided with two of the drive transmitting mechanisms 26 as illustrated in Figure 1. These two mechanisms 26 may be and preferably are identical in construction, except as to the arrangement of their gear connections to the shaft 21 and the housings for these gear connections. It will, therefore, be necessary to describe the construction and operation of only one of the two drive transmitting mechanisms 26, except as to the arrangement of their gear connections to the shaft 21 and the gear housings.

Figure 5:
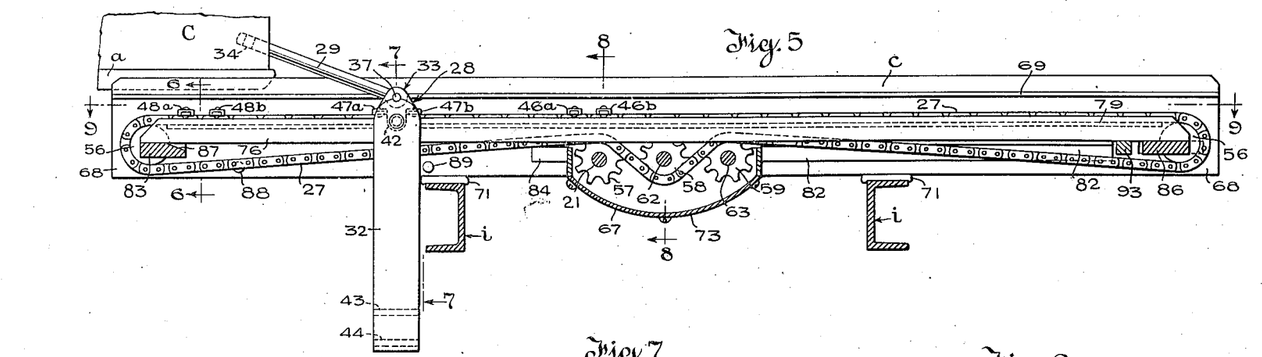
Figure 5 is a view taken on line 5—5 of Figure 1 and also on line 5—5 of Figure 8.
Figures 9, 10, 11, 20:
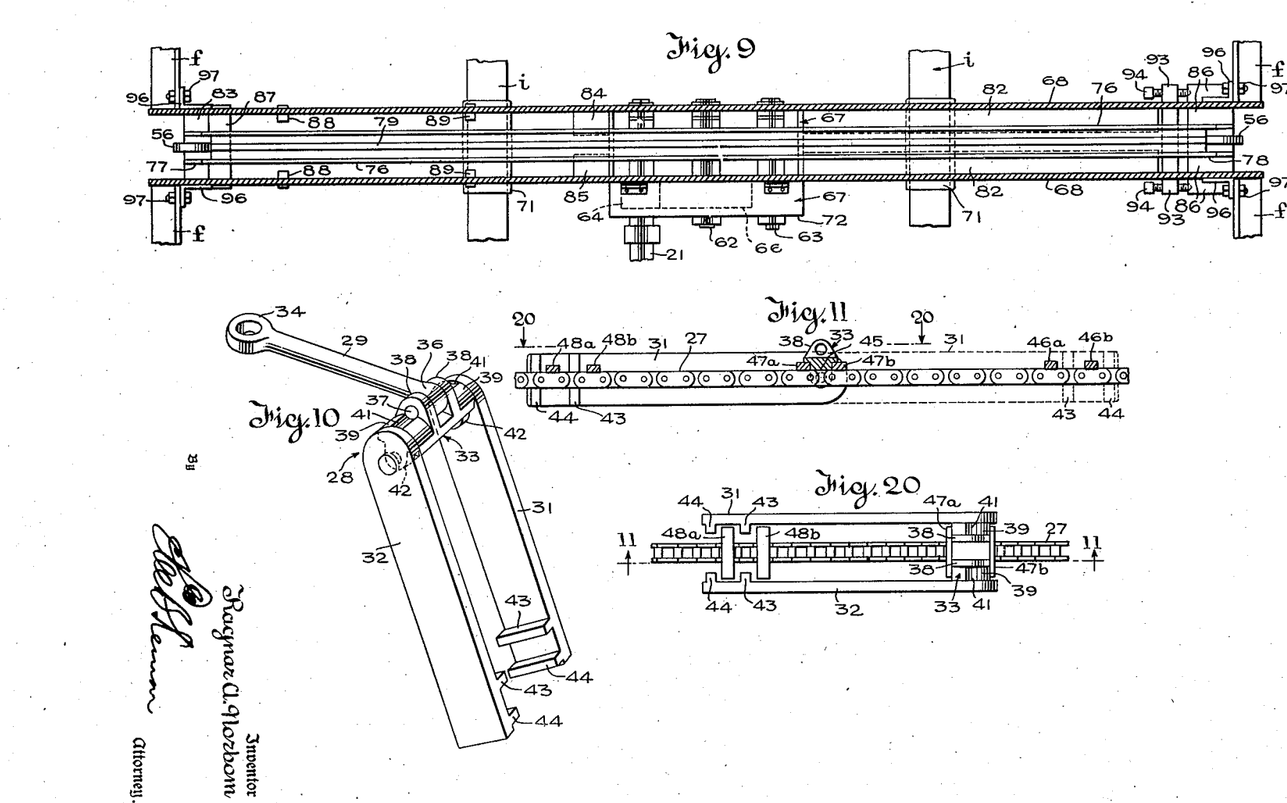
Figure 9 is a plan view taken on line 9—9 of Figure 5 and with the push-pull device and the chain removed from the transfer equipment.
Figure 10 is a perspective view of one of the push-pull devices shown in Figure 1.
Figure 11 is a view to show certain details of one of the push-pull devices of Figure 1 and its driving chain and is taken on line 11—11 of Figure 20.
Figure 20 is a plan view taken on line 20—20 of Figure 11.

A drive transmitting mechanism 26 (Figure 1) comprises a driving connection, which may be a flexible member or endless sprocket chain 27 (Figure 5), and a drive transmitting or push-pull device 28 (Figures 5 and 10). The device 28 is adapted to be driven by the chain 27 and may be readily detached therefrom. The device 28, when detached from the chain 27, appears as illustrated in Figure 10.

Figure 3:
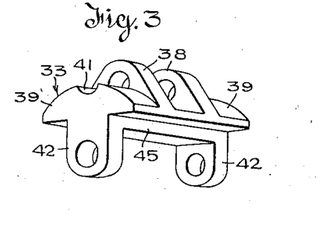
Figure 3 is a perspective view of an element of the transfer equipment shown in Figure 1.

A push-pull device 28 (see Figure 10) comprises members 29, 31 and 32 each of which is pivotally secured to a connecting element 33 (Figure 3). The member 29 may be termed a "push-pull member" and may have one end 34 adapted for suitable and detachable connection to the freight container D. The other end 36 of the push-pull member 29 is apertured to receive a pin 37, which pivotally secures the push-pull member 29 to two upstanding, spaced ears 38. If desired, the pin 37 may be non-rotatably and detachably secured to the ears 38, and the push-pull member 29 may be free to pivot or swing on the pin 37. The connecting element 33 (see Figures 3 and 10) may have reinforcing portions 39 on each side thereof to strengthen its construction. Each reinforcing portion 39 may be grooved at 41 to provide for assembly and removal of the pin 37. The connecting element 33 is provided at opposite sides thereof with two depending ears 42. Between the ears 42, the element 33 has on its underside a rectangular section 45 adapted to be driven by the chain 27 in a manner to be described. The connecting element 33 may be of one piece or integral construction as shown in Figure 3.

The members 31 and 32 are pivotally connected to the ears 42 as illustrated in Figure 10. Each of the members 31 and 32 may be termed a "link member", and is provided adjacent its free end (Figure 10), with two teeth or dog-like projections 43 and 44. The two link members 31 and 32 are of identical construction and have the same operation, and a description of one will suffice for both, although it is to be noted that the two link members 31 and 32 are mounted on the connecting element 33 with the teeth or dogs 43 and 44 of the member 31 facing the teeth or dogs 43 and 44 of the member 32 (see Figures 10 and 20).

The sprocket chain 27 comprises a plurality of pivotally connected chain links and, in a preferred embodiment of this invention, is provided with sets of driving lugs or lug means. One set comprises chain lugs 46a and 46b; a second set comprises chain lugs 47a and 47b, and a third set comprises lugs 48a and 48b. These sets of lugs are relatively spaced in the longitudinal direction of the chain 27 (see Figure 11). The lugs of set 47a and 47b are adapted to receive therebetween the section 45 (see Figures 3 and 11) of the element 33 to provide driving connection between the element 33 and the chain 27 (see Figures 3, 7 and 11). The link members 31 and 32 are adaped to be placed in either of two horizontal positions by an operation to be described hereinafter. In one horizontal position, the link members (31 and 32) are placed to the right of the connecting element 33 and are adapted to be driven by the set of lugs 46a and 46b (see link 31 in Figures 12 and 22). In the other horizontal position, the link members 31 and 32 are placed to left of the connecting element 33 and are adapted to be driven by the set of lugs 48a and 48b (see Figures 19 and 21). Each push-pull device 28 in a preferred embodiment of this invention is, therefore, adapted to be driven from the corresponding chain 27 through any one of three means. One means includes the intermediate set of chain lugs 47a and 47b and the section 45 of the connecting element 33 of the push-pull device 28. A second means includes the set of chain lugs 46a and 46b, the dogs or teeth 43 and 44, and the link members 31 and 32. A third means includes the set of lugs 48a and 48b, the dogs or teeth 43 and 44, and the link members 31 and 32.

Figure 4:
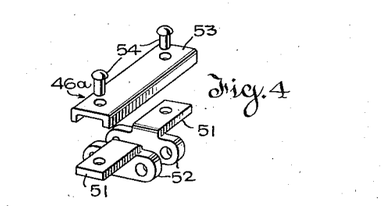
Figure 4 is an exploded view of a detail of the transfer equipment shown in Figure 1.

The same construction is provided for each of the chain lugs 46a, 46b, 47a, 47b, 48a, and 48b and may be understood by referring to the chain lug 46a of Figure 4. Each of these chain lugs is formed by providing lateral extensions or wings 51 on opposite links 52 of the chain 27, and securing a channel shaped member 53 to both of the wings 51 by suitable means, such as rivets 54.

Each chain 27 preferably extends from adjacent the beams $f$ (Figure 1) at one side of the trailer frame D to adjacent the beams $f$ at the opposite side of the trailer frame D. Where loading and unloading is to be lengthwise of the truck trailer, the chains 27 would extend from the front side of the frame D to the rear side thereof and parallel to the beams $f$. Adjacent each of two opposite sides of the trailer frame D, the chain 27 is trained over and about a stationary sheave or chain guiding and supporting means 56 (Figure 5). The upper reach of the chain 27 is substantially a straight section as may be seen, for example, in Figure 5. The lower section or reach of the chain 27 is trained over a sprocket wheel 57, under a sprocket wheel 58, and over a sprocket wheel 59 (see Figure 5). The sprocket wheels 57, 58 and 59 are mounted on shafts 21, 62 and 63, respectively. The shaft 21 is the driven shaft, being driven by the motor 20 as previously described and as illustrated in Figure 1. The sprocket wheel 57 is preferably rotatably mounted on the shaft 21, and a pinion or gear 64 (see Figure 2) is secured fast to the shaft 21. The pinion 64 meshes with a spur gear 66. The spur gear 66 is secured to a hub which is integral with the sprocket wheel 58 (see Figure 8). The spur gear 66, the sprocket wheel 58 and the connecting hub are rotatably mounted on the shaft 62 which is preferably a stationary shaft. The sprocket wheel 59 is rotatably mounted on the shaft 63, which is also preferably a stationary shaft. The sprocket wheel 58 is, therefore, the driving sprocket for the chain 27 and the sprocket wheels 57 and 59 are idle sprockets for maintaining proper driving relation between the chain 27 and the driving sprocket 58.

Figure 2:
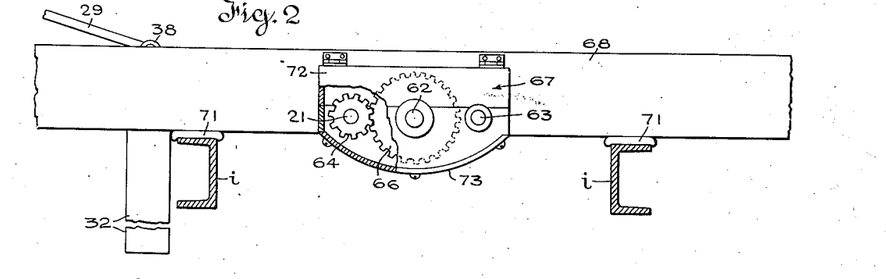
Figure 2 is a detail view taken on line 2—2 of Figure 1 and with the push-pull device in an intermediate stage of a transfer operation.
Figure 8:
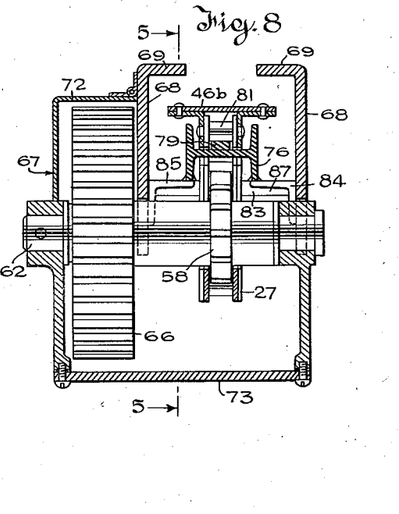

It may be noted here that each of the drive transmitting mechanisms 26 has a pinion 64 and a spur gear 66 on the side thereof facing the motor 20 and that each set of a pinion 64 and a spur gear 66 is enclosed in a housing 67 (see Figures 1, 2 and 8).

When the motor 20 (Figure 1) is operated, it drives the shaft 21 to rotate the pinion 64 (Figure 2) of each drive transmitting mechanism 26 (Figure 1). Each of the driven pinions 64 rotates the corresponding spur gear 66 (Figures 2 and 8) and thus rotates the corresponding driving sprocket 58 to drive its chain 27. By controlling the direction of operation of the motor 20 and/or the shaft 21 (Figure 1), the chain 27 of each drive transmitting mechanism 26 may be driven lengthwise (longitudinally) in one or the opposite direction at the will of the attendant or truck driver.

The housing and support for each chain 27 includes a set of two spaced angle beams or angle irons 68 having inwardly extending flanges 69 at their upper edges (see Figures 5 through 8). Each set of angle beams 68 extends in parallel relation to the corresponding chain 27 and is supported by the main sills $i$ of the trailer chassis (see Figures 2 and 5). If desired, suitable pads 71 may be placed between the main sills $i$ and the lower edges of the angle beams 68. The sprocket and gear housing 67 is suitably secured to and suspended from the angle beams 68 at substantially the longitudinal center thereof as illustrated in Figures 1, 2, 5 and 8. It may be noted here that each housing 67 is provided with suitable openings for receiving the corresponding stationary shafts 62 and 63 and with suitable bearings for supporting the corresponding end portion of the driving shaft 21. Each housing 67, as shown in Figure 8, may include a hinged cover member 72 and a removable bottom plate 73.

Each angle beam 68 may have a cut out portion to accommodate the corresponding housing 67. This cut out portion is approximately the same in length as the length of the housing 67 and extends upwardly from the lower edge of the beam 68 as shown in Figures 5 and 8.

The angle beams 68 and the trailer channels $c$ (Figure 1), if desired, may be included in the trailer frame D and provide reinforcement similar to the transverse frame members or beams $g$.

The upper reach or section of the chain 27 is supported by an I beam 76 which is placed on its side (see Figures 6, 7, 8 and 9). The I beam 76 is of a length corresponding substantially to the length of the upper reach or straight section of the chain 27 and has its opposite ends 77 and 78 (see Figure 9) bifurcated to receive the sheaves 56 at the opposite sides of the trailer frame D. A bar 79 (see Figures 5–9) is rigidly mounted on the upper side of the web of the I beam 76 and its opposite ends extend close to the periphery of the sheaves 56 at the opposite sides of the trailer frame D. The upper section or reach of the chain 27 is disposed between the upstanding flanges of the I beam, while the bar 79 fits between the links of the chain 27 to provide a rest and support for rollers 81 of the chain 27. These rollers 81 are mounted on pins which secure the links of the chain 27 in assembled relation. The bar 79, in addition to supporting the chain rollers 81, serves as a chain guide, since the lower edges of the chain links extend downwardly and along the sides of the bar 79. The bar 79 also serves to space the chain links from the I beam 76.

The support for the I beam 76 includes two spaced angle beams or angle irons 82 (Figures 5 and 9). The vertical flange or section of each angle beam 82 is secured, as by welding, to the vertical section of the corresponding angle beam 68. The horizontal flange of each angle beam 82 supports and is secured, as by welding, to the lower edge of the adjacent depending flange of the I beam 76. The angle beams 82 are positioned to extend from adjacent the corresponding housing 67 to adjacent a cross bar 93 at the right in Figures 5 and 9. Additional support for the I beam 76 is provided by a cross bar 83, two short sections of angle irons 84 and 85, and the cross bar 93. A cross bar 86 is slidably and adjustably mounted in two suitably shaped slots which are opposite each other and are formed in the vertical sections of the corresponding angle beams 68 (see Figures 5 and 9). The cross bars 83 and 86 are arranged adjacent the opposite ends 77 and 78 of the I beam 76. The cross bars 83 and 93 extend between and are secured, as by welding to the vertical sections of the angle beams 68 (Figures 5 and 9). The horizontal flange of each of the angle iron sections 84 and 85 extends between a depending flange of the I beam 76 and the vertical section of the adjacent angle beam 68 (Figure 8). The vertical sections of the angle irons 84 and 85 are secured, as by welding, to the vertical sections of the angle beams 68. The angle irons 84 and 85 (Figure 8) occupy positions similar to the angle beams 82, except that the angle irons 84 and 85 are arranged at the left of the sprocket and gear housing 67 (Figures 5 and 9).

The cross bar 83 has a beveled edge 87 (Figures 5, 9 and 15) for a purpose to be described hereinafter. Each of the cross bars 83 and 86 supports a sheave 56. Each sheave 56 is illustrated in the form of a disk having a section cut away so as to receive the corresponding cross bar (83 or 86). The cut away section of each sheave 56 conforms in shape to the cross sectional shape of the corresponding cross bar (83 or 86) as shown in Figure 5. Each sheave 56 is preferably welded in assembled relation to its cross bar (83 or 86). The sheaves 56 provide stationary chain guides with a curved periphery which fits between the chain links for engaging, supporting and guiding the chain rollers 81. If desired, conventional and rotatable sprocket wheels may replace the stationary sheaves 56.

The sheave 56 which is supported by the cross bar 86 is adjustable to vary the tension in the chain 27, as desired. The adjustment of the sheave 56 on the cross bar 86 is secured by shifting the latter along the slots in the angle beams 68. For the purpose of providing this adjustment, the ends of the cross bar 93 (see Figure 9) extend through and beyond the angle beams 68 and are threaded to receive set screws or bolts 94. The set screws 94, as shown in Figure 9, engage opposite end portions of the cross bar 86. By rotating or turning the screws 94, they are made effective to shift the cross bar 86 toward or away from the cross bar 93 and thereby adjust the position of the sheave 56 which is carried by the cross bar 86.

Figure 6:
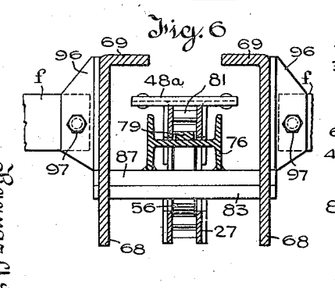
Figures 6, 7 and 8 are cross-sectional views taken on lines 6—6, 7—7, and 8—8 respectively of Figure 5.

The angle beams 68 may be assembled in the frame D of the trailer as shown, for example, in Figure 6. There are a number of the beams $f$ at opposite sides of the frame, and each end of an angle beam 68 is connected in suitable manner to an adjacent end of a frame beam $f$. For example, an angle piece 96 may be welded to the outer side of and adjacent each end of each angle beam 68. The adjacent end of a beam $f$ may be detachably and removably secured to the outwardly extending flange of the angle piece 96 as by means of a threaded bolt and nut connection 97.

Operation of Link Members

Figure 7:
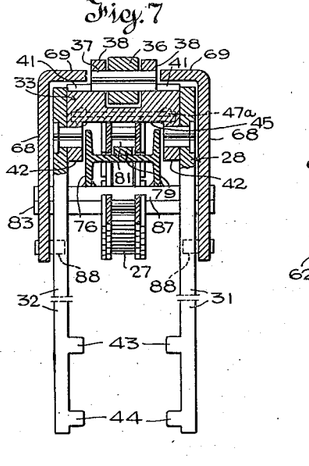
Figure 17:
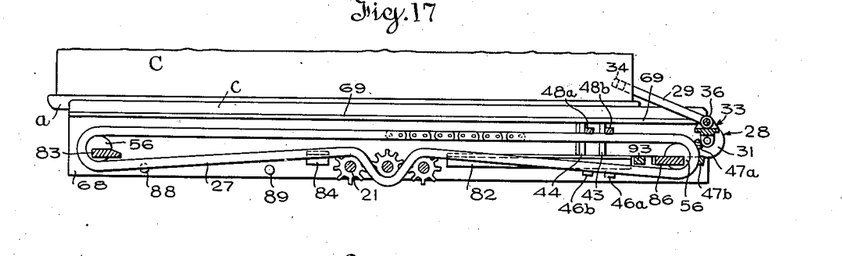
Figure 18:
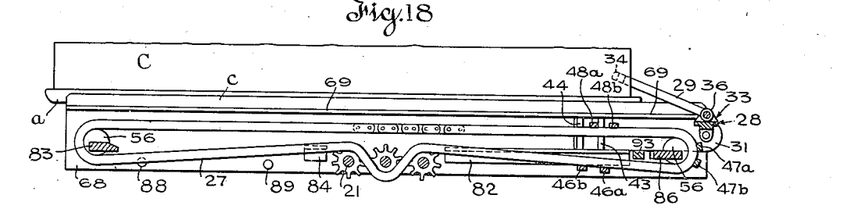
Figure 19:
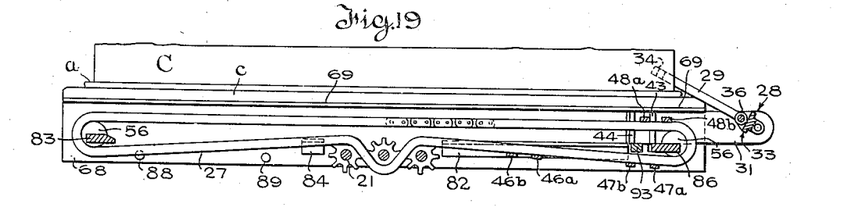

The construction described provides guiding and supporting means for the link members 31 and 32. In the operation of transferring the freight container C from the platform B to the trailer frame D, all of the link members (31, 32) travel in the same manner and as illustrated by Figures 12, 13, 14, 15, 5, 16, 17, 18 and 19, the figures being read in the order named. It will, therefore, be necessary to describe only the operation of one of the link members 31 and 32. Throughout its travel, the link member 31 moves in a path closely adjacent to the vertical section of the corresponding angle beam 68 and beneath the horizontal flange 69 of the same beam 68 (note Figure 7). Each of the angle beams 68 may, therefore, serve as part of a housing and guiding means for the adjacent link member (31 or 32) during the operation thereof. When the link member 31 is in the position illustrated in Figure 12, the lower edge of the link member (31) rests on the cross bar 83 and the upper edge abuts on the undersurface of the horizontal flange 69 of the adjacent angle beam 68. The angle beam 68 and the cross bar 83 are thus adapted to support the link member 31 in the extended position of Figure 12 and to provide a guideway in which the link member 31 (during operation of its push-pull device 28) may slide in a horizontal and longitudinal movement to and from the position of Figure 14. As the push-pull device 28 travels to the right from the Figure 14 position, the link member 31 slides on the beveled edge 87 of the cross bar 83 and swings downwardly under gravity action to the position illustrated by Figure 15. The lower edge of the link member 31 now rests also on a pin 88, there being a separate pin 88 for each of the link members (31 and 32) as illustrated in Figures 7 and 9. These pins 88 are also mounted on the angle beams 68 as illustrated in Figures 7 and 9. As the push-pull device 28 travels to the right and away from the position of Figure 15, the link member 31 passes beyond the cross bar 83 and slides downwardly on the pin 88 until the link member 31 is vertically suspended and supported solely by its pivotal connection to the element 33. The cantilever 31 is now in the same suspended position as that illustrated by the link member 32 in Figure 5. While so suspended, the link member 31 is carried to the right by the push-pull device 28 until the link member 31 reaches a pin 89 which except for its location is similar to the pins 88. A second pin 89 is provided for the link member 32 as illustrated in Figure 9. As the push-pull device 28 continues its travel to the right, the link member 31 slides up and over the pin 89 and at the same time swings about its pivotal connection to the element 33 until the link member 31 is in the position represented in Figure 16. In the further movement of the push-pull device 28, the link member 31 slides onto the corresponding angle bar 84, which brings the link member 31 to a horizontal position above the pin 89. The link member 31 has now been reversed from a leading position to a following position relative to the element 33 (see full line position of link member 31 in Figure 11). The push-pull device 28 continues to the right with the link member in a following and horizontal position and the forward or pivoted end of the link member 31 reaches the support provided by the horizontal flange of the corresponding angle beam 82 (see Figures 9 and 17) before the following end of the link member 31 slides off the edge of the angle iron 84. The link member 31 is thus supported in horizontal position as it passes the sprocket and gear housing 67. The horizontal flange of the corresponding angle beam 82 provides guide means for slidably supporting the link member 31 in horizontal position as the push-pull device 28 travels from adjacent the sprocket and gear housing 67 to the cross bar 86 which is shown in Figures 5 and 9. The cross bar 86 and the horizontal flange 69 of the corresponding angle beam 68 support the link member 31 in horizontal position (see Figure 19) as the push-pull device 28 travels in the manner illustrated by Figures 17, 18 and 19 respectively. Figure 19 shows the cantilever 31 in extended position at the right.

When the push-pull devices 28 are returned to their Figure 1 positions, the link members 31 and 32 travel in paths which are the reverse of that just described. It will be noted that the link members 31 and 32 reverse their positions in either direction of travel of the push-pull devices 28 and their chains 27 and that this reversal in position takes place as the link members (31 and 32) travel between the cross bar 83 and the angle irons 84 and 85. During the entire travel of the link members 31 and 32 between the angle irons 84, 85 and the cross bar 86, the link members 31 and 32 are in a horizontal position and at the left of the element 33 (looking at Figure 17 for example). In passing from one to the other of the cross bar 83 and an angle iron (84 or 85), each link member (31 and 32) is free to fall through space and simultaneously swing on its pivotal connection to the corresponding element 33. The pins 88 and 89 may be omitted, but their use is preferred since they provide a smoother operation in reversing the link members 31 and 32 and also minimize wear on the link members (31 and 32). One function of the pins 89 is to so guide the link members 31 and 32 that the latter do not strike the sharp edges of the left main sill *i* (Figure 5) in the link reversing operations.

*Operation of chain lugs*

The spacing of the chain lugs 46a, 46b, 47a, 47b, 48a and 48b lengthwise of the corresponding chain 27 is preferably such that they are effective to change the drive for the push-pull device 28 from the leading set of lugs to the second or intermediate set and thereafter from the second set to the third or following set while the chain 27 is traveling in either direction and without requiring the attention of the attendant or operator. The spacing of the lugs on a chain 27 is illustrated, for example, in Figure 11. This figure shows a section of chain 27 including its lugs (46a, 46b, 47a, 47b, 48a and 48b) and illustrates the link 31 in two positions—left position in full lines and right position in dotted lines. It will be understood that the link 32 is operated in the same manner as the link 31. The lugs 47a and 47b are adapted to engage opposite sides of the section 45 of the element 33, the lug 47a being adapted to drive the element 33 and thereby the push-pull device 28, including its link members 31 and 32, to the right, and the lug 47b being adapted to drive the element 33 and thereby the push-pull device 28, including its link members 31 and 32, to the left. When swung on its pivotal connection to the element 33, the link 31 may be placed in either the full line position or the dotted line position of Figure 11. In the full line position (see Figure 11) of the link 31, its teeth or dogs 43 and 44 are spaced a short distance from and to the left of the lugs 48b and 48a respectively (note also Figure 20). In the dotted line position (see Figure 11) of the link 31, its teeth or dogs 43 and 44 are spaced a short distance from and to the right of the lugs 46a and 46b respectively. With the push-pull device 28 being driven through the element 33 (Figure 11) and by the lugs 47a and 47b, the link 31 may be swung through an angle of approximately 180° in the manner previously explained and to either of the positions illustrated in Figure 11 without the teeth 43 and 44 engaging the lugs 46a, 46b, 48a and 48b. Driving engagement between the lugs 47a and 47b and the element 33 is effective to maintain the link teeth 43 and 44 free of the dogs 48a and 48b with the link 31 in the left or full line position (Figures 11 and 20) and the teeth 43 and 44 free of the dogs 46a and 46b with the link 31 in the right or dotted line position (Figure 11). When the link members 31 and 32 are placed as represented by the full line position of link 31 in Figure 11, the link teeth 43 and 44 are disposed relative to the chain lugs 48a and 48b as shown in Figure 20. The teeth 43 and 44 extend toward the chain 27 and in the path of, but spaced from, the adjacent ends of the chain lugs 48a and 48b. When the link members 31 and 32 are swung to position represented by link 31 in dotted lines of Figure 11, the link member teeth 43 and 44 assume positions relative to the adjacent ends of the chain lugs 46a and 46b similar to those illustrated in Figure 20 and as shown in Figure 11.

Assuming now the element 33 of a push-pull device 28 is being driven to the right by the chain lug 47a and the link 31 in the full line position of Figure 11, this driving relation continues until the lug 47a reaches a position over the sheave 56 at the right (Figure 5) and begins its downward travel along the sheave 56. During this driving relation (Figure 11), the rate of movement of the driving lug 47a is the same as the rate of movement of the straight section or upper reach of the chain 27. As the lug 47a moves about the sheave 56 in the first stage of the downward travel, the lug 47a moves at a rate which is faster than the rate of movement of the upper reach of the chain 27. This faster rate of movement occurs since the chain links supporting the lug 47a swing on their pin connections to adjacent chain links as well as travel with the chain 27 during engagement with the sheave 56. The increased speed or additional movement of the lug 47a, as it begins its downward travel, is effective to shift the element 33 and consequently the link 31 to the right at a faster rate of movement than the rate of movement of the straight section or upper reach of the chain 27. This shifting movement advances the teeth 44 and 43 in relation to the dogs 48a and 48b as illustrated by Figure 17. The horizontal position of the link 31 is maintained by the guiding means (86, 69) described above and the lug 47a passes downwardly and away from engagement with the element 33 as illustrated in Figures 17 and 18. There is a brief pause in the operation of the link 31 while the lug 48a travels from the Figure 17 position and overtakes the link member tooth or dog 43 as illustrated in Figure 18. Continued operation of the chain 27 in the same direction results in the dog 48a driving the tooth 43, and the link 31 being shifted to the extended position illustrated by Figure 19.

Figure 12:
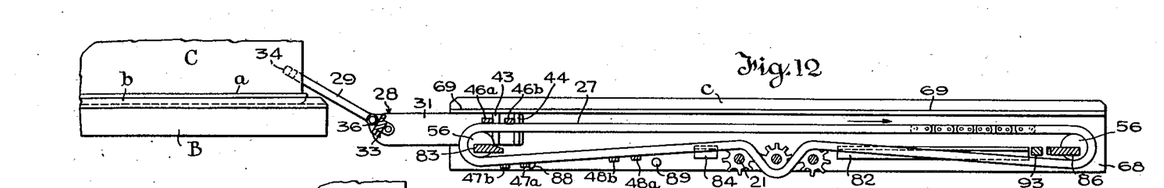
Figures 12 through 19 are, in general, diagrammatic views to illustrate the operation of the present invention in transferring a freight container from the railway car to the highway truck of Figure 1.
Figures 13, 14:
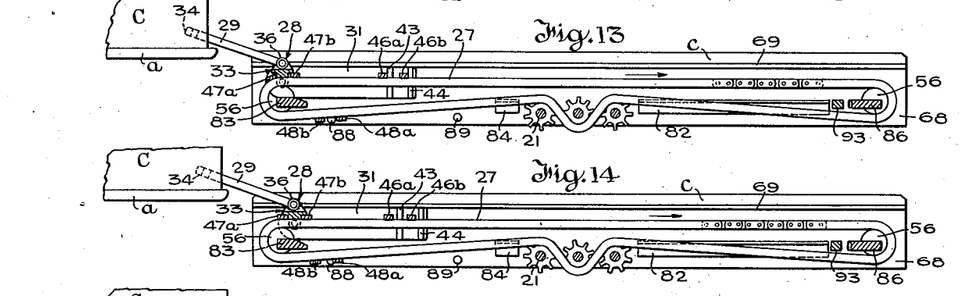

The operations explained above in connection with the movement of the push-pull device 28 from the full line position of Figure 11 to the position of Figure 19 will be duplicated when the link 31 is in the dotted line position of Figure 11 and the full line position of Figure 14 and the straight section or upper reach of the chain 27 is driven to the left. In this latter case, the element 33 is driven by the lug 47b, and the drive changes so that the chain lug 46b overtakes and drives the tooth or dog 43 until the link 31 is in the extended position illustrated by Figure 12.

The change in drive of a push-pull device 28 from one of the two sets of lugs (46a, 46b and 48a, 48b) for driving the link members 31 and 32 to the set of lugs (47a, 47b) for driving the element 33 is accomplished in the following manner. Assume a chain 27 and the corresponding push-pull device 28 are in the relative arrangement of Figure 12 and the upper reach of the chain 27 is moving to the right. The teeth 43 and 44 of the link 31 are driven to the right by the chain lugs 46a and 46b respectively. When the chain lug 47b enters the upper reach of the chain 27, it takes a position in front of the element 33 (see Figure 13). As the chain lug 47a approaches the top of the left sheave 56 of Figure 13, it (lug 47a) is traveling at a faster rate of movement (due to the described pivotal movement of the supporting chain links) than the upper reach of the chain 27 and the push-pull device 28. Therefore, as the lug 47a reaches a position to the rear of element 33 and engages the latter, the lug 47a is effective to increase the rate of movement of the push-pull device 28 and to shift the link members 31 and 32 in such manner that the link member teeth 43 and 44 advance ahead of the chain lugs 46a and 46b. The link members 31 and 32 thus become disengaged from the lugs 46a and 46b and assume the position illustrated by the link member 31 in Figure 14. As the lug 47a takes over the drive, it swings the element 33 on its pivotal connections to the link members 31 and 32 until the element 33 is arrested by the leading chain lug 47b (see Figures 12, 13, 14). The lugs 47a and 47b now maintain the element 33 in upright position until they (47a and 47b) pass downwardly along the right sheave 56 as in Figure 17. The link members 31 and 32 are free to fall away from the chain 27 as the element 33 of the push-pull device 28 is advanced by the chain lug 47a from the position of Figure 14 to the position of Figure 15. The same sequence of chain lug operations takes place in driving the push-pull device 28 from the position of Figure 19 to the position of Figure 16. In the latter case, the teeth or dogs 44 and 43 of the link members 31 and 32 are driven by the dogs 48a and 48b respectively until the drive changes and the dog 47b is effective to drive the element 33.

Figure 21:
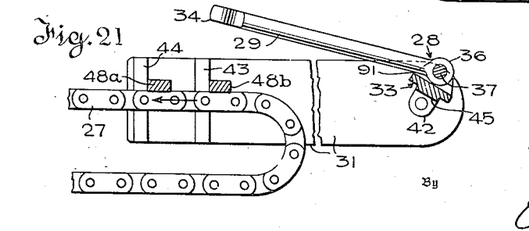
Figures 21 and 22 are, in general, diagrammatic views to illustrate a push-pull device and its chain in two stages of the operation of the equipment of Figure 1 for transferring a container from the vehicle to an adjacent platform, such as a railway car.
Figure 22:
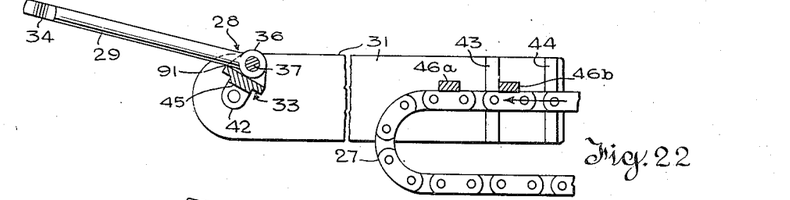

When the link members 31 and 32 are in an extended position (projecting beyond a side of the trailer frame D) and are being driven by the chain 27, the relative arrangement of the corresponding push-pull member 29, the link members (31 and 32), and the corresponding element 33 is determined by whether the device 28 is pushing or pulling the freight container C. When the device 28 is pulling the container C during the initial and concluding stages of a loading operation, the element 33 is tilted to the left (see Figures 12 and 19). When the push-pull device 28 is pushing the container C during the initial and concluding stages of an unloading operation, the element 33 is tilted to the right until arrested by contact of the edge 91 with the lower side of the member 29 (see Figures 21 and 22). Figure 21 shows the arrangement of a push-pull device 28 in the initial stage of a vehicle unloading operation, and Figure 22 shows a push-pull device 28 in the concluding stage of a vehicle unloading operation.

Assuming a push-pull device 28 in the position of Figure 12 and the upper reach of the chain moving to the right, the element 33 is tilted to the left, and in such position relative to its link members 31 and 32 that when the element 33 arrives over the left sheave 56, the chain lug 47a will engage the rearward portion of the section 45 of the element 33 and swing the element 33 to an upright position abutting the lug 47b. Assuming the conditions illustrated by Figure 21, it will be noted that the element 33 is tilted to the right relative to its link members 31 and 32. As the upper reach of the chain 27 moves to the left and the element 33 arrives over the right sheave 56 (Figure 5 for example), the chain lug 47b engages the rearward side of the section 45 of the element 33 and swings the element 33 to the left and into an upright position abutting the chain lug 47a.

As the drive of a push-pull device 28 changes from the intermediate set of lugs 47a and 47b to the following set of lugs (46a, 46b or 48a, 48b), the element 33 remains in upright position due to its connection with the container C and the link members 31 and 32 (see for example Figures 17 and 18). As soon as the following set of lugs (46a, 46b or 48a, 48b) takes over the drive and moves the link members 31 and 32, the element 33 tilts rearwardly until it is in position to transmit the drive to the container C. Figure 19 shows the element 33 tilted rearwardly and its push-pull device 28 in extended position at the end of a loading operation, while Figure 22 shows the element 33 tilted rearwardly and the push-pull device 28 at the end of an unloading operation.

*Loading the truck trailer*

Figure 15:
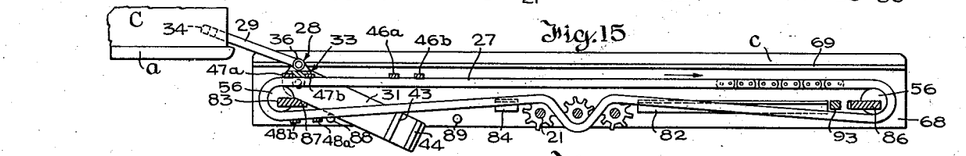
Figure 16:
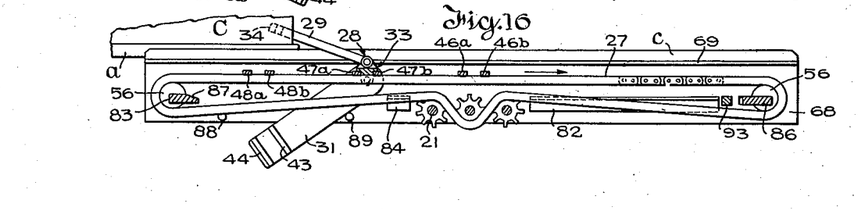

The truck trailer is parked adjacent and parallel to the platform B as illustrated in Figure 1. The bridges d are set in place with the channels b and c and the bridges d in alignment and register as illustrated in Figure 1. The outer ends 34 of the push-pull members 29 are suitably secured to the freight container C, and the push-pull devices 28 are adjusted to the positions illustrated by Figures 1 and 12. The operator now operates a suitable control of conventional form (not shown) to start the motor 20 (Figure 1) and drive the chain 27 of each drive transmitting mechanism 26 in the direction indicated by the arrow in Figure 12. The motor control (not shown) may be a button operated electrical switch. The operator need only maintain the switch button depressed in order to accomplish the complete transfer of the container C from the platform B (Figures 1 and 12) to the truck trailer (Figure 19). While the two chains 27 are traveling from the stage indicated by Figure 12 to the stage indicated by Figure 13, the link members 31 and 32 of both push-pull devices 28 (Figure 1) are similarly driven by the lugs 46a and 46b of the two drive transmitting mechanisms 26. The container C is now in the position of Figure 13. As the two push-pull devices 28 shift the container C from the position of Figure 13 to the position of Figure 14, the drives for the link members 31 and 32 become disengaged and the drive is taken up by the lugs 47a of both drive transmitting mechanisms 26, which lugs 47a drive the elements 33 of the two push-pull devices 28. The lugs 47a now provide the drive of the push-pull devices 28 through the stages represented by Figures 14 through 17 and until each lug 47a reaches the position illustrated by Figure 17. During the drive of the push-pull devices 28 from the position illustrated by Figure 14 to the position illustrated by Figure 17, all of the link members 31 and 32 fall and reverse themselves by pivotal movement on their connections to the elements 33. Three positions of the link members 31 and 32 in this falling and reversal operation are illustrated by Figures 15, 5 and 16. During the last half of the travel to the right of the push-pull devices 28, the link members 31 and 32 are in a horizontal position and follow the respective elements 33. When the elements 33 of the two push-pull devices 28 reach the right hand end of the upper reach of the chains 27 (Figure 17), the drive between the lugs 47a and the elements 33 becomes disengaged. The chain lugs 48a then advance and overtake the teeth 43 of the link members 31 and 32 (Figure 18) to take over the drive. As the chain 27 advances from the Figure 17 to the Figure 18 position, the push-pull device 28 remains at rest as shown in Figures 17 and 18. Continued operation of the chains 27 is effective to shift the link members 31 and 32 to an extended position wherein the elements 33 are supported beyond the truck trailer (see Figure 19). The operator now releases the control for the motor 20, and the transfer operation is concluded with the freight container C in the position of Figure 19 and properly centered on the trailer frame D. It is thus to be noted that the operation of the transfer equipment is continued until concluded and requires for its control only the starting of the motor 20 by the operator when the push-pull devices 28 are secured to the container C (Figures 1 and 12) and the stopping of the motor 20 by the operator when the container C is properly loaded on the truck trailer (Figure 19).

During hauling and trucking operations of the vehicle, the push-pull devices 28 are suitably stored away. For example, each push-pull member 29 may be disconnected from both the container C and the corresponding element 33 and then supported on a suitable hanger carried by the vehicle. The remainder (link members 31 and 32 and element 33) of each push-pull device 28 may then be stored by controlling the motor 20 and operating the chains 27 until the element 33 and the attached link-members 31 and 32 are withdrawn to an out-of-the-way position between the end limits of the corresponding angle beams 68.

In order to completely remove the push-pull devices 28 from their chains 27, the motor 20 is controlled to drive the chains 27 until the devices 28 each reach a fully extended position at a side of the vehicle and drop off the corresponding chain. In order to reposition a push-pull device 28, the driver may suitably control the motor 20 to position the chain lugs and may arrange the link members 31 and 32 on one of the cross bars 83 or 86 so that the teeth 43 and 44 of the link members 31 and 32 will engage the proper chain lugs.

When a push-pull device 28 is to be positioned for a loading operation, its element 33 and link members 31 and 32 are driven by its chain 27 to a position such as illustrated in Figure 12. The end 34 of the push-pull member 29 is suitably connected to the container C and then its end 36 is coupled to the element 33 by means of the pin 37.

*Unloading the trailer*

The operation of unloading the truck trailer is substantially the same as the described and illustrated loading operation. In preparing for an unloading operation, each push-pull device 28 is arranged as illustrated in Figure 21 and with the end 34 of the push-pull member 29 suitably secured to the container to be unloaded. In the initial stage of an unloading operation for the vehicle, the element 33 of each push-pull device 28 is tilted to the right until arrested by the push-pull member 29 and the teeth 44 and 43 of the link members 31 and 32 are driven by the chain lugs 48a and 48b, as in Figure 21. As the drive of each push-pull device 28 is taken over by a chain lug 47b, the latter engages and swings the element 33 to the left and into engagement with the leading chain lug 47a. The element 33 is now in upright position, which is maintained until the drive of its push-pull device 28 is taken over by the chain lug 46b. The element 33 of each push-pull device 28 then assumes the rearwardly inclined position illustrated by Figure 22. Figures 16, 5 and 15 in the order named illustrate the reversing operation of the link members (31 and 32) in the travel of the push-pull devices 28 during the vehicle unloading operation.

From the foregoing explanation and the accompanying drawings, it is clear that the present invention permits the use of a sprocket chain or driving means, the overall reach of which need not be greater than the corresponding dimension (in the drawings, the width) of the trailer frame D. It is also clear that the push-pull devices 28 are adapted to reach beyond the trailer frame D in both the initial and concluding stages of a loading or unloading operation. The invention, therefore, provides transfer equipment which during hauling operations of the truck does not extend beyond the trailer frame D and does not alter the overall dimensions of the truck trailer. When the container C is completely transferred to the trailer frame D (see Figure 19), the container C is suitably secured in place against movement during the hauling trip of the truck A. Since the gearing 22 includes a worm and worm wheel, it provides a self-locking means for the drive of the chains 27 and the push-pull devices 28 when the motor 20 is not operating.

It is to be understood that the foregoing description and the accompanying drawings disclose a preferred embodiment of this invention and that the invention includes all modifications and embodiments coming within the scope of the appended claims.

I claim:

1. In equipment for transferring freight containers, the equipment being adapted to be mounted on a vehicle and comprising: a push-pull device having an element for connection to a freight container and also having at least one link member connected to said element, driving means adapted to move said device relative to the vehicle and between two positions, and means for changing the relative arrangement of said element and said link member as said device is moved from one to the other of said positions whereby said link member first leads said element and then said element leads said link member in the movement of said device from one to the other of said positions, said driving means having disengageable driving connection with said element to drive said device during said change in the relative arrangement of said element and said member, said driving means also having disengageable driving connection with said link member to drive said device during the initial and final stages of the movement of said device from one to the other of said two positions.

2. Equipment as recited in claim 1, wherein the driving means for moving the push-pull device includes a flexible member such as a chain.

3. In equipment for transferring freight containers, the equipment being adapted to be mounted on a vehicle and comprising: a push-pull device having an element for connection to a freight container and also having at least one link member connected to said element, driving means adapted to move said device relative to the vehicle and between a position in which said link member extends outwardly from one side of the vehicle and a position in which said link member extends outwardly from the opposite side of the vehicle, and means providing for relative movement of said element and said link member as said link member is moved from one to the other of said positions whereby said link member first leads said element and then said element leads said link member in the movement of said device from one to the other of said positions, said element with said link member in either of said positions being positioned beyond the corresponding side of the vehicle, said driving means having disengageable driving connection with said element to drive said device during said relative movement of said element and said link member, said driving means also having disengageable driving connection with said link member during the initial and final stages of the movement of said device from one to the other of said two positions.

4. In equipment for transferring freight containers, the equipment being adapted to be mounted on a vehicle and comprising: a push-pull device having an element for connection to a freight container and also having at least one link member connected to said element; means adapted to drive said element and said link member for moving said device relative to the vehicle and between two positions; and means for changing the relative arrangement of said element and said link member as said device is moved from one to the other of said positions; said link member first pulling said element, next following said element with the element driven by said drive means, and then pushing said element, said driving means having disengageable driving connection with said element to drive said device during said relative movement of said element and said link member.

5. In equipment for transferring freight containers, the equipment being adapted to be mounted on a vehicle and comprising: a flexible member such as a chain; means for operating said flexible member in the lengthwise direction thereof; at least three driving means carried by said flexible member and relatively spaced in the lengthwise direction of said flexible member; a push-pull device having an element adapted to be driven by the second or intermediate one of said three driving means, and at least one link member connected to said element for movement relative thereto and between leading and following positions relative to said element and the direction of travel of said flexible member, said link member being adapted in one position to be driven by the first of said three driving means and in the other position to be driven by the third of said three driving means; and means effective for shifting said link member from the leading position to the following position relative to said element and as said element is being driven by said second or intermediate driving means.

6. In equipment for transferring freight containers, the equipment being adapted to be mounted on a vehicle and comprising: a flexible member such as a chain; means for operating said flexible member in the lengthwise direction thereof; a plurality of driving means carried by said flexible member and relatively spaced in the lengthwise direction of said flexible member; a push-pull device having an element adapted to be driven by one of said driving means, and at least one link member connected to said element for movement relative thereto and between leading and following positions relative to said element and the direction of travel of said flexible member, said link member being adapted in one position to be driven by a preceding one of said driving means and in the other position to be driven by a succeeding one of said driving means; and means effective for shifting said link member from the leading position to the following position relative to said element and as said element is being driven by the driving means intermediate between said preceding and succeeding ones.

7. In equipment for transferring freight containers, the equipment being adapted to be mounted on a vehicle and comprising: a flexible member such as a chain, means for driving said flexible member lengthwise, a link member, a first means for slidably guiding said link member for longitudinal movement and extending adjacent and lengthwise of said flexible member, a second means for slidably guiding said link member for longitudinal movement and extending adjacent and lengthwise of said flexible member, said first guide means and said second guide means being relatively spaced and in alignment with each other, an element connected to said link member and adapted to have disengageable driving connection with said flexible member, said link member during the drive of said element by said disengageable driving connection being adapted to pass from one to the other of said first and second link guide means and to move from a leading position to a following position relative to said element, and means adapted to provide disengageable driving connection between said flexible member and said link member and adapted to be conditioned by said movement of said link member relative to said element.

8. In equipment for transferring freight containers, the equipment being adapted to be mounted on a vehicle and comprising: a flexible member such as a chain; means for operating said flexible member in the lengthwise direction thereof; at least three driving means carried by said flexible member and relatively spaced in the lengthwise direction of said flexible member; a push-pull device having an element and at least one link member, said element being adapted for connection to a container to be transferred, said link member being adapted to be driven longitudinally by a first of said three driving means with said element positioned adjacent the rearward end of said link member and driven thereby to initiate a transfer operation, said element being adapted to engage and to be driven by a second of said driving means during an intermediate stage of said transfer operation, said element and said link member having relative movement during said intermediate stage for positioning said element adjacent the forward end of said link member, and said link member being adapted to be driven longitudinally by a third of said driving means with said element positioned adjacent the forward end of said link member and driven thereby to complete said transfer operation; and means cooperating with said link member to slidably support and guide said link member during the drive thereof by said first driving means and said third driving means and to provide for said relative movement of said link member and said element during said intermediate stage of the transfer operation and during said drive of said element by said second driving means.

9. In equipment for transferring freight containers, the equipment being adapted to be mounted on a vehicle and comprising: guide members such as sheaves adjacent opposite sides of the load support of the vehicle, a flexible member extending between and trained over and at least partially around each of said guide members, means for driving said flexible member lengthwise and in reverse directions, a push-pull device including an element and at least one link member connected to said element for movement relative thereto, aligned guide means adjacent each of said guide members and adapted to slidably receive and support said link member for substantially longitudinal movement, means providing disengageable driving connection between said element and said flexible member, means providing for movement of said link member relative to said element during the drive of said element by said disengageable drive connection means in both directions of travel of said flexible member and thereby adapted to reverse said link member from a leading position to a following position relative to said element as said link member is traveling from one to the other of said aligned guide means, and means adapted to provide disengageable driving connection between said link member and said flexible member with said link in said leading position and in said following position and with said element drive connection means disengaged.

10. In equipment for transferring freight containers, the equipment being adapted to be mounted on a vehicle and comprising: supporting and guiding members such as sheaves adapted to be mounted in spaced relation on the load support of the vehicle, flexible means such as a chain extending between and trained at least partially around each of said supporting and guiding members, means for driving said flexible member lengthwise and in reverse directions, at least three sets of driving lugs secured to said flexible member, said sets being relatively spaced lengthwise of said flexible member, an element adapted for driving engagement with and disengageable from an intermediate or second set of said driving lugs, a push-pull member adapted to be pivotally secured at one end thereof to said element and adapted at its other end to be detachably secured to a freight container, at least one link member pivotally secured adjacent one end thereof to said element and adapted to be moved relative to said element, means for guiding said link member and adapted to provide for pivotal movement of said link member from a leading position to a following position relative to said element as said element is driven by said intermediate set of lugs, said intermediate set of lugs in passing downwardly of and about said guiding members being adapted to disengage said element while a following set of lugs becomes effective to drive said link member for shifting said element to a position beyond said flexible member, and means adjacent each of said guiding members and adapted to support slidably said link member for substantially longitudinal movement.

11. In equipment for transferring freight containers, the equipment being adapted to be mounted on a vehicle and comprising: supporting and guiding members adapted to be mounted in spaced relation on the load support of the vehicle, a flexible member such as a chain extending between and trained over and at least partially around each of said supporting and guiding members, a first, a second and a third driving means carried by said flexible member and spaced relatively to each other in the lengthwise direction of said flexible member, means for moving said flexible member lengthwise and in opposite directions, a drive transmitting device including an element and at least one link member connected to said element for movement relative thereto, means carried by said element and adapted for driving engagement with said second driving means carried by said flexible member, means carried by said link member and adapted for selective driving engagement with said first and said third driving means carried by said flexible member, and guide means for slidably supporting said link member adjacent each of said guiding members and for providing for shifting movement of said link member from a leading position to a following position relative to said element in the travel of said device from one to the other of said guide members, said shifting movement of said link member relative to said element being adapted to position selectively said link member relative to said first driving means and said third driving means carried by said flexible member.

12. Equipment as recited in claim 11, wherein the drive of said device changes automatically from the first driving means to the second driving means as said second driving means passes upwardly and over one of the guide members for the flexible member and from said second driving means to the third driving means as said second driving means passes over and downwardly along the other of said guide members.

13. In equipment for transferring freight containers, the equipment being adapted to be mounted on a vehicle and comprising: a drive transmitting device including an element, at least one link member, and means pivotally connecting said element and said member; means adjacent a side of the load support of the vehicle and adapted to slidably support and guide said link member for substantially longitudinal movement; means adjacent the opposite side of the vehicle load support and adapted to slidably support said link member for longitudinal movement; a supporting and guiding member adjacent each of said link supporting and guiding means; a flexible member, such as a chain, extending between and trained at least partially around each of said supporting and guiding members; means for moving said flexible member lengthwise and in reverse direction; a first means on said flexible member and adapted to drive said link member when said link member is slidably supported and guided by one of said supporting and guiding means and thereby to shift said pivotal connecting means over a predetermined distance extending outwardly of the adjacent guiding member, a second means on said flexible member and adapted to drive said element from a position adjacent said last named guiding member to a position adjacent the other of said guiding members, said link member during the drive of said element by said second driving means being adapted to pass from said one guiding means and onto the other of said guiding means, means providing for shifting of said link member from a leading position to a following position relative to said element as said link member passes from said one to said other guiding means, and a third means on said flexible member and adapted to drive said link member when said link member is slidably supported by said other guiding means and thereby to shift said pivotal connecting means over a predeter- mined distance extending outwardly of said other guiding member.

14. Equipment as recited in claim 13, wherein said first driving means and said link member become disengaged by action of said second driving means as it rises along one of said guiding members and takes up the drive of said element, said second driving means and said element being disengaged by movement of said second driving means along and downwardly of said other guiding member, and said third driving means being adapted to take over the drive of said link member after said disengagement between said second driving means and said element.

15. In equipment for transferring freight containers, the equipment being adapted to be mounted on a vehicle and comprising: means providing a curved guide and support, a flexible member such as a chain trained upwardly along and over said curved guide and support means and extending in a substantially straight line therefrom, a first lug means on said flexible member, a second lug means on said flexible member, means for driving said flexible member lengthwise, a push-pull device including an element adapted for connection to a container and at least one link member connected to said element, said element being adapted to be driven by said first lug means in the travel thereof in said straight line and to be disengaged by said first lug means as said first lug means travels over and downwardly along said curved guide and support means, said link member being adapted to be driven by said second lug means, and means adjacent said curved guide and support means for slidably supporting and guiding said link member for movement longitudinally thereof, said first lug means and said second lug means being so relatively spaced lengthwise of said flexible member that said link member and said second lug means are disengaged with said first lug means driving said element, that said second lug means engages said link member in driving relation as said first lug means travels downwardly along said curved guide and support means, and that said first lug means in traveling upwardly along said curved guide and support means engages said element in driving relation and thereby shifts said device to disengage said link member and said second lug means.

16. Equipment as recited in claim 15, wherein the element in being driven by the first lug means is supported by the flexible member.

17. Equipment as recited in claim 15, wherein the link member and the element are pivotally connected, and the link member is adapted to pivot on said element and fall in a direction away from the flexible member in the drive of said element by the first lug means in the direction away from the curved guide and support means for the flexible member.

18. Equipment as recited in claim 15, wherein the link member is pivotally connected to the element and is suspended from said element with said element being driven by the first lug means and in position spaced from the curved guide and support means, and means are provided in the path of said suspended link member to swing said link member to a following position relative to said element as said first lug means drives said element relative to said curved guide and support means.

19. In equipment for transferring freight containers, the equipment being adapted to be mounted on a vehicle and comprising: a push-pull device having a push-pull member, two link members, and an element pivotally connected to said push-pull member and to each of said link members; means adapted for mounting on the vehicle to move said device relative to the vehicle and including a flexible member, such as a chain, and means for driving said flexible member in the lengthwise direction; said device being adapted to be placed on said flexible member with said element extending across said flexible member and with said link members arranged at opposite sides of said flexible member; means providing disengageable driving connection between said flexible member and said element with said device placed on said flexible member; means adapted to provide disengageable driving connection between said flexible member and each of said link members with said link members in substantially parallel relation to said flexible member; and means extending along part of the path of said flexible member for slidably guiding and supporting said link members for longitudinal movement and in said substantially parallel relation to said flexible member.

20. In equipment for transferring freight containers, the equipment being adapted to be mounted on a vehicle and comprising: a push-pull device having a push-pull member, two link members, and an element pivotally connected to said push-pull member and to each of said link members; means adapted for mounting on the vehicle to move said device relative to the vehicle and including a flexible member, such as a chain, and means for driving said flexible member in the lengthwise direction; said device being adapted to be placed on said flexible member with said element extending across said flexible member and with said link members arranged at opposite sides of said flexible member; said element having a projection on its underside, said flexible member having a set of spaced lugs for receiving said projection therebetween, whereby said projection and said lugs provide a disengageable driving connection between said flexible member and said element; said link members each having at least one lug on the side thereof facing said flexible member, said flexible member having at least one other lug so positioned and spaced from said set of lugs as to be out of the path of said link members and said link member lugs during pivotal movement of said link members relative to said element and with said element projection in driving engagement with said set of lugs, said one other lug projecting laterally from said flexible member and from the opposite sides thereof to provide disengageable driving connections with said link member lugs and with said element projection disengaged from said set of lugs, and means extending along part of the path of said flexible member for slidably guiding and supporting said link members for longitudinal movement and with said link members in position to provide engagement of said one other lug with said lugs of said link member.

21. In equipment for transferring freight containers, the equipment being adapted to be mounted on a vehicle and comprising: a push-pull device including means for connection with the freight container and at least one link member, means adjacent a side of the vehicle to support slidably and guide said link member for substantially rectilinear, longitudinal movement between a position in which said link member extends outwardly from said support and guide means and from said vehicle side and a position in which said link member is arranged inwardly of said vehicle side, a guide member mounted on said vehicle adjacent said vehicle side, and a chain trained over said guide member and adapted for longitudinal movement to selectively and successively engage in driving relation said connection means and said link member for providing said longitudinal movement of said link member.

22. In equipment for transferring freight containers, the equipment being adapted to be mounted on a vehicle and comprising: a push-pull device including means for connection with the freight container and at least one link member, means adjacent a side of the vehicle to support slidably and guide said link member for substantially rectilinear, longitudinal movement between a position in which said link member extends outwardly from said support and guide means and from said vehicle side and a position in which said link member is arranged inwardly of said vehicle side, a guide member such as a sheave adjacent said support and guide means, a flexible member such as a chain mounted on the vehicle and trained at least partially around said guide member and extending toward the opposite side of the vehicle, means for moving said flexible member lengthwise and in opposite directions, and means providing disengageable connection between said link member and said flexible member for longitudinally moving said link member between said link positions.

23. Equipment as recited in claim 22, wherein a second disengageable connection means is adapted to provide driving relation between the flexible member and the push-pull device, said second connection means being effective to take over the drive of said device with said link member in the inwardly arranged position and to produce movement of said link member relative to said flexible member for disengaging the first mentioned connection means, said link member in the drive of said device by said second connection means in the direction away from said guide member being adapted to move away from the supporting and guiding means and to move under gravity action and to a suspended position on said push-pull device.

24. In equipment for transferring freight containers, the equipment being adapted to be mounted on a vehicle and comprising: a chain-like flexible member, means for driving said flexible member lengthwise, a link member, an element adapted for connection to a freight container to be transferred and also connected to said link member, said element being adapted to have disengageable driving connection with said flexible member, said link member during the drive of said element by said disengageable driving connection being adapted to move from a leading position to a rearward position relative to said element, and means adapted to provide disengageable driving connection between said flexible member and said link member for moving said element to and from a position beyond the reach of said flexible member, said last-named means being adapted to be conditioned by said movement of said link member from a leading position to a rearward position relative to said element.

25. In equipment as recited in claim 24, wherein the link member is pivotally connected to the element and swings downwardly and then upwardly through an angle of substantially 180 degrees in moving from the leading position to the rearward position.

26. In equipment for transferring freight containers, the equipment comprising: a push-pull device having an element, a link member, means for connecting said element to a freight container and separate means for connecting said link member and said element; means for coacting with said element to drive said element and thereby the freight container and said link member during an intermediate stage of a container transfer operation and for coacting with said link member to move said link member in the longitudinal direction thereof for initiating and completing a container transfer operation; said link member during said coaction thereof with said driving means being adapted to drive said element for shifting the freight container, said link member during drive of said element by coaction thereof with said driving means being adapted to pass from a leading position to a rearward position relative to said element.

27. In equipment for transferring freight containers, the equipment comprising: a push-pull device having an element, a link member, means for connecting said element to a freight container, and separate means for connecting said link member and said element; and propelling means for driving said push-pull device, said propelling means being operative in the continued drive thereof to engage said link member adjacent the forward end thereof and thereby drive said link member forwardly and longitudinally with said element in position adjacent the rearward end of said link member and driven thereby in an initial stage of a container transfer operation, to disengage said link member and engage and drive said element in an intermediate stage of said container transfer operation, and to disengage said element and engage said link member adjacent the rearward end thereof and thereby drive said link member forwardly and longitudinally with said element in position adjacent the forward end of said link member and driven thereby in completing said transfer operation, said link member and said element in said drive of said element by said engagement thereof with said propelling means having relative movement effective to rearrange said element from said rearward position to said forward position.

28. In equipment for transferring freight containers, the equipment being adapted to be mounted on a vehicle and comprising: a drive transmitting device including an element adapted for connection to a freight container and at least one link member connected to said element; and means adapted to shift said device from a position adjacent one side to a position adjacent the opposite side of said vehicle by driving said link member and said element individually and in succession; said means in said shifting of said device first engaging with said link member to drive said member longitudinally in a forward direction, next engaging with said element to drive said element in said forward direction and then engaging with said link member to drive said member longitudinally in said forward direction; said link member and said element, in said drive of said element by said means, having relative movement providing rearrangement from a relation in which said element is positioned adjacent the rearward end of said link member and is driven thereby to a relation in which said element is positioned adjacent the forward end of said link member and is driven thereby.

RAGNAR A. NORBOM.

CERTIFICATE OF CORRECTION.

December 8, 1942.

Patent No. 2,304,117.

RAGNAR A. NORBOM.

It is hereby certified that error appears in the printed specification of the above numbered patent requiring correction as follows: Page 3, first column, line 58, for "adaped" read --adapted--; page 5, first column, lines 30 and 73, for "cantilever" read --link member--; line 57, for "Migures" read --Figures--; page 12, first column, line 3, beginning with "26. In equipment for" strike out all to and including the word and period "element," in line 22, comprising claim 26, and for the claims now numbered "27" and "28" read --26-- and --27--; and insert the following as claim 28:

--In equipment for transferring freight containers, the equipment being adapted to be mounted on a vehicle and comprising: a driving means, a link member, means extending adjacent each of two opposite sides of the vehicle for slidably guiding said link member for substantially rectilinear, longitudinal movement, an element connected to said link member and adapted to have disengageable driving connection with said driving means, said link member during the drive of said element by said driving means being adapted to pass from one to the other of said guiding means and to move from a leading position to a following position relative to said element, and means adapted to provide disengageable driving connection between said driving means and said link member with said link member guided in said guiding means.--;

and that the said Letters Patent should be read with this correction therein that the same may conform to the record of the case in the Patent Office.

Signed and sealed this 26th day of January, A. D. 1943.

Henry Van Arsdale,
Acting Commissioner of Patents.

(Seal)